(12) United States Patent
Ausen et al.

(10) Patent No.: US 9,724,865 B2
(45) Date of Patent: Aug. 8, 2017

(54) THREE-DIMENSIONAL POLYMERIC STRAND NETTING, DIES, AND METHODS OF MAKING THE SAME

(71) Applicant: 3M INNOVATIVE PROPERTIES COMPANY, St. Paul, MN (US)

(72) Inventors: Ronald W. Ausen, St. Paul, MN (US); Timothy J. Diekmann, Maplewood, MN (US); Thomas P. Hanschen, Mendota Heights, MN (US); William J. Kopecky, Hudson, WI (US); Shou-Lu Wang, Woodbury, MN (US)

(73) Assignee: 3M INNOVATIVE PROPERTIES COMPANY, Saint Paul, MN (US)

( * ) Notice: Subject to any disclaimer, the term of this patent is extended or adjusted under 35 U.S.C. 154(b) by 296 days.

(21) Appl. No.: 14/349,104

(22) PCT Filed: Sep. 28, 2012

(86) PCT No.: PCT/US2012/057900
§ 371 (c)(1),
(2) Date: Apr. 2, 2014

(87) PCT Pub. No.: WO2013/052371
PCT Pub. Date: Apr. 11, 2013

(65) Prior Publication Data
US 2014/0234605 A1 Aug. 21, 2014

Related U.S. Application Data

(60) Provisional application No. 61/543,481, filed on Oct. 5, 2011.

(51) Int. Cl.
*B29D 28/00* (2006.01)
*B29C 47/06* (2006.01)
(Continued)

(52) U.S. Cl.
CPC .......... *B29C 47/06* (2013.01); *B29C 47/0014* (2013.01); *B29C 47/0028* (2013.01);
(Continued)

(58) Field of Classification Search
CPC ..... B29C 47/06; B29C 47/30; B29C 47/0028; B29C 47/14; B29C 47/085;
(Continued)

(56) References Cited

U.S. PATENT DOCUMENTS 2,053,173 A 9/1936 Astima
3,012,275 A 12/1961 Nalle, Jr.
(Continued)

FOREIGN PATENT DOCUMENTS

EP 0097496 1/1984
GB 836555 6/1960
(Continued)

OTHER PUBLICATIONS

International Search Report for PCT International Application No. PCT/US2012/057900, mailed on Apr. 25, 2013, 7 pages.

*Primary Examiner* — Nancy Johnson
(74) *Attorney, Agent, or Firm* — Gregory D. Allen

(57) ABSTRACT

Method and extrusion die (1030) for producing a three-dimensional polymeric strand netting, wherein a plurality of the polymeric strands (1070a, 1070b, 1070c) are periodically joined together in a regular pattern at bond regions throughout the array, wherein a majority of the polymeric strands (1070a, 1070b, 1070c) are periodically bonded to at least two (three, four, five, six, or more) adjacent polymeric strands, and wherein no polymeric strands are continuously bonded to a polymeric strand. Three-dimensional polymeric strand netting described herein have a variety of uses, including wound care, tapes, filtration, absorbent articles, pest control articles, geotextile applications, water/vapor (Continued)

management in clothing, reinforcement for nonwoven articles, self bulking articles, floor coverings, grip supports, athletic articles, and pattern coated adhesives.

16 Claims, 8 Drawing Sheets

(51) Int. Cl.
- B29C 47/30 (2006.01)
- D04H 13/00 (2006.01)
- B29C 47/00 (2006.01)
- B29C 47/08 (2006.01)
- B29C 47/14 (2006.01)
- D01D 4/02 (2006.01)
- B29L 28/00 (2006.01)

(52) U.S. Cl.
CPC ........ B29C 47/0064 (2013.01); B29C 47/065 (2013.01); B29C 47/085 (2013.01); B29C 47/14 (2013.01); B29C 47/30 (2013.01); B29D 28/00 (2013.01); D01D 4/02 (2013.01); D04H 13/00 (2013.01); B29L 2028/00 (2013.01); Y10T 442/184 (2015.04); Y10T 442/186 (2015.04)

(58) Field of Classification Search
CPC ............ B29C 47/0064; B29C 47/0014; B29C 47/065; D04H 3/00; D01H 4/02; B29D 28/00; Y10T 4442/186; Y10T 4442/184; B29L 2028/00
See application file for complete search history.

(56) References Cited

U.S. PATENT DOCUMENTS

| | | |
|---|---|---|
| 3,019,147 A | 1/1962 | Nalle, Jr. |
| 3,032,008 A | 5/1962 | Land |
| 3,054,148 A | 9/1962 | Zimmerli |
| 3,163,691 A | 12/1964 | Anderson |
| 3,178,328 A | 4/1965 | Tittmann |
| 3,302,501 A | 2/1967 | Greene |
| 3,394,211 A | 7/1968 | MacDuff |
| 3,471,588 A | 10/1969 | Kanner |
| 3,471,597 A | 10/1969 | Schirmer |
| 3,524,789 A | 8/1970 | Olsen |
| 3,713,761 A * | 1/1973 | Bramley .................. D04H 3/12 140/10 |
| 3,831,741 A | 8/1974 | Poupitch |
| 4,038,008 A | 7/1977 | Larsen |
| 4,384,022 A | 5/1983 | Fowler |
| 4,472,328 A | 9/1984 | Sugimoto |
| 4,621,898 A | 11/1986 | Cohen |
| 4,634,485 A | 1/1987 | Welygan |
| 4,636,419 A | 1/1987 | Madsen |
| 4,656,075 A | 4/1987 | Mudge |
| 4,661,389 A | 4/1987 | Mudge |
| 4,732,723 A | 3/1988 | Madsen |
| 4,933,081 A | 6/1990 | Sasaki |
| 5,077,870 A | 1/1992 | Melbye |
| D364,277 S * | 11/1995 | Worral .................. D25/152 |
| 5,660,778 A | 8/1997 | Ketcham |
| 5,679,379 A | 10/1997 | Fabbricante |
| 5,728,469 A | 3/1998 | Mann |
| 5,811,186 A | 9/1998 | Martin |
| 5,948,517 A | 9/1999 | Adamko |
| 5,972,463 A | 10/1999 | Martin |
| 6,074,505 A | 6/2000 | Ouellette |
| 6,083,856 A | 7/2000 | Joseph |
| 6,093,663 A | 7/2000 | Ouellette |
| 6,228,449 B1 | 5/2001 | Meyer |
| 6,240,817 B1 | 6/2001 | James |
| 6,348,249 B2 | 2/2002 | Meyer |
| 6,391,420 B1 | 5/2002 | Cederblad |
| 6,398,370 B1 | 6/2002 | Chiu |
| 6,465,107 B1 | 10/2002 | Kelly |
| 6,692,606 B1 | 2/2004 | Cederblad |
| 6,994,904 B2 | 2/2006 | Joseph |
| 7,329,621 B2 | 2/2008 | Collier, IV |
| 7,335,273 B2 | 2/2008 | Neculescu |
| 7,467,873 B2 | 12/2008 | Clarke |
| 8,329,976 B2 | 12/2012 | Freiding |
| 8,758,882 B2 | 6/2014 | Ausen |
| 2001/0008690 A1 | 7/2001 | Okamoto |
| 2005/0271858 A1 * | 12/2005 | Ausen ................ A44B 18/0061 428/100 |
| 2006/0246256 A1 * | 11/2006 | Ausen ................ A44B 18/0011 428/100 |
| 2008/0009821 A1 * | 1/2008 | Seth ................... A44B 18/0046 604/391 |
| 2011/0092123 A1 | 4/2011 | Gupta |
| 2013/0004723 A1 | 1/2013 | Ausen |
| 2013/0004729 A1 | 1/2013 | Ausen |
| 2013/0009336 A1 | 1/2013 | Ausen |
| 2013/0011600 A1 | 1/2013 | Ausen |
| 2014/0050883 A1 | 2/2014 | Hanschen |
| 2014/0220328 A1 * | 8/2014 | Ausen ................... B29D 28/00 428/219 |

FOREIGN PATENT DOCUMENTS

| | | |
|---|---|---|
| GB | 2262906 | 7/1993 |
| JP | 38004487 | 4/1963 |
| JP | 61189927 | 8/1986 |
| WO | WO 2012/112768 | 8/2012 |
| WO | WO 2013/028654 | 2/2013 |
| WO | WO 2013/032683 | 3/2013 |
| WO | WO 2013/148128 | 10/2013 |

* cited by examiner

THREE-DIMENSIONAL POLYMERIC STRAND NETTING, DIES, AND METHODS OF MAKING THE SAME

CROSS REFERENCE TO RELATED APPLICATIONS

This application is a national stage filing under 35 U.S.C. 371 of PCT/US2012/057900, filed Sep. 28, 2012, which claims priority to U.S. Provisional Application No. 61/543481, filed Oct. 5, 2011, the disclosure of which is incorporated by reference in their entirety herein.

BACKGROUND

Polymeric nets are used for a wide variety of applications, including reinforcement of paper articles or cheap textiles (e.g., in sanitary paper articles, paper cloth, and heavy duty bags), non-woven upholstery fabrics, window curtains, decorative netting, wrapping material, mosquito netting, protective gardening netting against insects or birds, backing for growing of grass or plants, sport netting, light fishing netting, and filter materials.

Extrusion processes for making polymeric nets are well known in the art. Many of these processes require complex dies with moving parts. Many of these processes can only be used to produce relatively thick netting with relatively large diameter strands and/or relatively large mesh or opening sizes.

Polymeric netting can also be obtained from films by slitting a pattern of intermittent lines, which are mutually staggered, and expanding the slit film while stretching. This process tends to produce netting of a relatively large mesh and with relatively weak cross-points.

There exists a need for a relatively simple and economical process for producing polymeric nettings.

SUMMARY

In one aspect, the present disclosure describes a three-dimensional polymeric strand netting, wherein a plurality of the polymeric strands are periodically joined together in a regular pattern at bond regions throughout the netting, wherein at least some (in some embodiments, a majority by number) of the polymeric strands are periodically bonded to at least three (, four, five, six, or more) adjacent polymeric strands, and wherein no polymeric strands are continuously bonded to another polymeric strand. In some embodiments, the at least three polymeric strands will be respectively part of first, second, and third arrays of polymeric strands. In some embodiments, the arrays of polymeric strands are formed from the same polymer, in other embodiments the arrays of polymeric strands are formed of two or more polymers. In some embodiments, at least some of the arrays of polymeric strands are two-component strands. In some embodiments that have two-component strands, those strands have a core of a first polymeric material and a sheath of a second, different polymeric material. In some embodiments where some of the polymeric strands have a core/sheath arrangement, at least some of these cores have at least two (in some embodiments at least 3 or more) sheaths).

In another aspect, the present disclosure describes a method of making a three-dimensional netting, the method comprising:

providing an extrusion die comprising a plurality of shims positioned adjacent to one another, the shims together defining at least a first cavity and a dispensing surface, wherein the dispensing surface has a first array of first dispensing orifices and second array of second dispensing orifices positioned adjacent to each other, alternating with a third array of third dispensing orifices; wherein the plurality of shims comprises a plurality of a repeating sequence of shims, wherein the repeating sequence comprises a shim that provides a fluid passageway between a cavity and one of the first dispensing orifices, a shim that provides a fluid passageway between a cavity and one of the second dispensing orifices, and a shim that provides a fluid passageway between a cavity and one of the third dispensing orifices; and dispensing polymeric strands from at least one of the first, second, or third arrays of dispensing orifices at a first strand speed while simultaneously dispensing polymeric strands from at least one of the other arrays at a second strand speed, wherein the first strand speed is at least 2 (in some embodiments, in a range from 2 to 6, or even 2 to 4) times the second strand speed to provide the three-dimensional netting.

In another aspect, the present disclosure describes an extrusion die comprising a plurality of shims positioned adjacent to one another, the shims together defining at least a first cavity and a dispensing surface, wherein the dispensing surface has a first array of first dispensing orifices, a second array of second dispensing orifices, and a third array of third dispensing orifices, the third array being disposed generally between the first and second arrays; wherein the plurality of shims comprises a plurality of a repeating sequence of shims, wherein the repeating sequence comprises a shim that provides a fluid passageway between a cavity and one of the first dispensing orifices, a shim that provides a fluid passageway between a cavity and one of the second dispensing orifices, and a shim that provides a fluid passageway between a cavity and one of the third dispensing orifices. In some embodiments, the extrusion die further comprises a fourth array (or more) of fourth (or more) dispensing orifices. In some embodiments, the orifices of each respective array are collinear with the other orifices of that array across the face of the dispensing surface. Typically, orifices within an array are spaced apart by at least two times greater than the width of the orifices, to prevent continuous bonding of two strands emerging from the same array. Typically, the arrays of dispensing orifices are parallel to, but offset from each other across the face of the dispensing surface. Typically, this offset is not greater than the height of adjacent orifices so that strands emerging from different arrays will bond in a thickness direction. A photograph of an exemplary dispensing surface having arrays that satisfy the just described criteria is shown in FIG. 13.

In some embodiments of the die, the shims further define at least a second cavity, wherein the repeating sequence of shims provide a fluid passageway from both the first and second cavities to one of the arrays, and wherein the first cavity is supplied with a first polymer and the second cavity is supplied with a second polymer so as to dispense two-component strands from that array. In some such embodiments, the two-component strands have a core/sheath arrangement.

Three-dimensional polymeric strand netting described herein have a variety of uses, including wound care and other medical applications (e.g., elastic bandage-like material, surface layer for surgical drapes and gowns, and cast padding), tapes (including for medical applications), filtration, absorbent articles (e.g., diapers and feminine hygiene products) (e.g., as a layer(s) within the articles and/or as part of an attachment system for the articles), pest control articles (e.g., mosquito nettings), geotextile applications (e.g., erosion control textiles), water/vapor management in clothing, reinforcement for nonwoven articles (e.g., paper towels), self bulking articles (e.g., for packaging) where the netting thickness is increased by stretching nettings with first strands have average first yield strength, and wherein the second strands have an average second yield strength that is different (e.g., at least 10 percent different) than the first yield strength, floor coverings (e.g., rugs and temporary mats), grip supports for tools, athletic articles, etc., electrodes in light weight lead acid batteries, and pattern coated adhesives.

DETAILED DESCRIPTION

Figure 1:
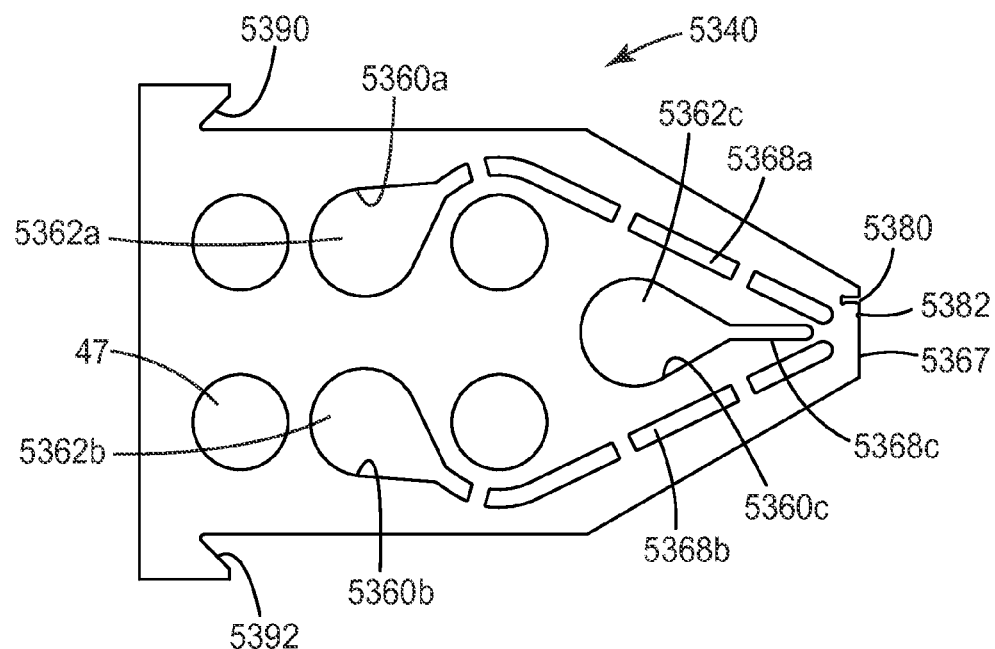
FIG. 1 is a plan view of shim particularly suited to form a repeating sequence of shims capable of forming a three-dimensional polymeric strand netting described herein.

The dispensing surface comprises at least three arrays of orifices. These arrays are typically extruded at a strand speed difference of at least two times to create the discontinuous bonds in the net network. For example, the top and bottom array of strands can be extruded at a speed that is two times greater than the center layer to create the bonds in the net between arrays. As an additional example, the center layer can be extruded two times faster than the top and bottom layers to create the bonds in the net between arrays. These orifices are typically collinear within the array and are offset with other orifice arrays of the dispensing surface. The cross direction spacing between orifices within a given array is typically at least twice the width of the orifice, such that the extruded strands, from the array of strands extruded at the same speed, do not form a continuous bond. The spacing between arrays of orifices typically overlap or nearly overlap, such that the resultant arrays create zones of strands that in the thickness direction of the netting structure. Strands in each zone bond to strands in an adjacent zone(s). Typically, the spacing is not greater than the height of adjacent orifices. It is envisioned that the arrays do not need to be collinear, but may form other patterns to create the multi-layer netting.

In some embodiments, the plurality of shims comprises a plurality of at least one repeating sequence of shims that includes shims that provide a passageway between a first and second cavity and the first dispensing orifices. In some of these embodiments, there will be additional shims that provide a passageway between the first and/or the second cavity, and/or a third (or more) cavity and second dispensing orifices. Typically, not all of the shims of dies described herein have passageways, as some may be spacer shims that provide no passageway between any cavity and a dispensing orifice. In some embodiments, there is a repeating sequence that further comprises at least one spacer shim. The number of shims providing passageway to the first dispensing orifices may be equal or unequal to the number of shims providing a passageway to the second dispensing orifices, which may be equal or unequal to the number of shims providing a passageway to the third dispensing orifices.

In some embodiments, extrusion dies described herein include a pair of end blocks for supporting the plurality of shims. In these embodiments it may be convenient for one or all of the shims to each have one or more through-holes for the passage of connectors between the pair of end blocks. Bolts disposed within such through-holes are one convenient approach for assembling the shims to the end blocks, although the ordinary artisan may perceive other alternatives for assembling the extrusion die. In some embodiments, the at least one end block has an inlet port for introduction of fluid material into one or both of the cavities.

In some embodiments, the shims will be assembled according to a plan that provides a repeating sequence of shims of diverse types. The repeating sequence can have diverse numbers of shims per repeat. For a first example, a four-shim repeating sequence is described below in connection with FIG. 7. When that four-shim repeating sequence is properly provided with molten polymer, it extrudes a netting formed from three sets of polymeric strands that, although they have bonds between the sets of strands, in general form different zones within the thickness direction of the netting.

Exemplary passageway cross-sectional shapes include square and rectangular shapes. The shape of the passageways within, for example, a repeating sequence of shims, may be identical or different. For example, in some embodiments, the shims that provide a passageway between the first cavity and a first dispensing orifice might have a flow restriction compared to the shims that provide a conduit between the second cavity and a second dispensing orifice. The width of the distal opening within, for example, a repeating sequence of shims, may be identical or different. For example, the portion of the distal opening provided by the shims that provide a conduit between the first cavity and a first dispensing orifice could be narrower than the portion of the distal opening provided by the shims that provide a conduit between the second cavity and a second dispensing orifice.

In some embodiments, the assembled shims (conveniently bolted between the end blocks) further comprise a manifold body for supporting the shims. The manifold body has at least one (or more (e.g., two or three, four, or more)) manifold therein, the manifold having an outlet. An expansion seal (e.g., made of copper or alloys thereof) is disposed so as to seal the manifold body and the shims, such that the expansion seal defines a portion of at least one of the cavities (in some embodiments, a portion of both the first and second cavities), and such that the expansion seal allows a conduit between the manifold and the cavity.

Typically, the passageway between cavity and dispensing orifice is up to 5 mm in length. Sometimes the fluid passageways leading to one array has greater fluid restriction than the fluid passageways leading to one or more of the other arrays.

In some embodiments, for extrusion dies described herein, each of the dispensing orifices of the first and the second arrays have a cross sectional area, and each of the dispensing orifices of the first arrays has an area different than that of the second array.

Typically, the spacing between arrays of orifices overlap or nearly overlap. The spacing between array orifices is greater than the resultant diameter of the strand after extrusion. This diameter is commonly called die swell. This spacing between orifices is greater than the resultant diameter of the strand after extrusion leads to the strands repeatedly colliding with each other to form the repeating bonds of the netting. If the spacing between orifice arrays is too great the strands will not collide with each other and will not form the netting. Typically, the spacing between orifices of the same array is greater than two times the width of the orifice, to prevent continuous bonding of strands extruded at the same speed.

The shims for dies described herein typically have thicknesses in the range from 50 micrometers to 125 micrometers, although thicknesses outside of this range may also be useful. Typically, the fluid passageways have thicknesses in a range from 50 micrometers to 750 micrometers, and lengths less than 5 mm (with generally a preference for smaller lengths for decreasingly smaller passageway thicknesses), although thicknesses and lengths outside of these ranges may also be useful. For large diameter fluid passageways several smaller thickness shims may be stacked together, or single shims of the desired passageway width may be used.

The shims are tightly compressed to prevent gaps between the shims and polymer leakage. For example, 12 mm (0.5 inch) diameter bolts are typically used and tightened, at the extrusion temperature, to their recommended torque rating. Also, the shims are aligned to provide uniform extrusion out the extrusion orifice, as misalignment can lead to strands extruding at an angle out of the die which inhibits desired bonding of the net. To aid in alignment, an alignment key can be cut into the shims. Also, a vibrating table can be useful to provide a smooth surface alignment of the extrusion tip.

The size (same or different) of the strands can be adjusted, for example, by the composition of the extruded polymers, velocity of the extruded strands, and/or the orifice design (e.g., cross sectional area (e.g., height and/or width of the orifices)). For example, an orifice in, for example, the first array that is 3 times greater in area than an orifice in, for example, the second array can generate a netting with equal first and second strand sizes while meeting the velocity difference between adjacent strands.

In general, it has been observed that the rate of strand bonding is proportional to the extrusion speed of the faster strand. Further, it has been observed that this bonding rate can be increased, for example, by increasing the polymer flow rate for a given orifice size, or by decreasing the orifice area for a given polymer flow rate. It has also been observed that the distance between bonds (i.e., strand pitch) is inversely proportional to the rate of strand bonding, and proportional to the speed that the netting is drawn away from the die. Thus, it is believed that the bond pitch and the netting basis weight can be independently controlled by design of the orifice cross sectional area, the takeaway speed, and the extrusion rate of the polymer. For example, relatively high basis weight nettings, with a relatively short bond pitch can be made by extruding at a relatively high polymer flow rate, with a relatively low netting takeaway speed, using a die with a relatively small strand orifice area.

Some of the embodiments of dies according to the present disclosure have an array of vestibules in which a core/sheath strand is formed. Such dies can include a plurality of shims comprising a plurality of a repeating sequence of shims. Such a repeating sequence can include shims that provide a fluid passageway between the first cavity and one of the vestibules, shims that provide a second passageway extending from the second cavity to the same vestibule, and shims that provide a third passageway extending from the second cavity to the same vestibule, wherein each of the second and third passageways are on opposite sides of the first passageway, and each of the second and third passageways has a dimension larger than the first passageway at the point where the first passageway enters the vestibule. This allows the flows from the second and third passageways to encapsulate the material entering the vestibule from the first passageway. Obtaining good encapsulation of the core material entering from the first passageway depends in part on the melt viscosity of the sheath material. In general, lower melt viscosity of the sheath material improves the encapsulation of the core material. Further, the encapsulation depends in part on the degree to which the second and third passageways have a dimension larger than the first passageway at the point when they enter the vestibule. In general, increasing the degree by which that dimension is larger for the second and third passageways relative to same dimension for the first passageway will improve the encapsulation of the core material. Good results are obtained when the dimensions of the passageways and pressures within the cavities are manipulated so that the flow speed of the sheath materials within the vestibule and the flow speed of the core materials within the vestibule are close to one another. Additional information about shim based dies that form netting where at least some of the strands have a core/sheath arrangement can be found in application having U.S. Ser. No. 61/530,521, filed Sep. 2, 2011, the disclosure of which is incorporated herein by reference.

In practicing methods described herein, the polymeric materials might be solidified simply by cooling. This can be conveniently accomplished passively by ambient air, or actively by, for example, quenching the extruded first and second polymeric materials on a chilled surface (e.g., a chilled roll). In some embodiments, the first and/or second and/or third polymeric materials are low molecular weight polymers that need to be cross-linked to be solidified, which can be done, for example, by electromagnetic or particle radiation. In some embodiments, it is desirable to maximize the time to quenching to increase the bond strength.

Optionally, it may be desirable to stretch the as-made netting. Stretching may orientate the strands, and has been observed to increase the tensile strength properties of the netting. Stretching may also reduce the overall strand size, which may be desirable for applications which benefit from a relatively low basis weight. As an additional example, if the materials and the degree of stretch, are chosen correctly, the stretch can cause some of the strands to yield while others do not, tending to form loft (e.g., the loft may be created because of the length difference between adjacent bonded netting strands or by curling of the bonds due to the yield properties of the strands forming the bond). The attribute can be useful for packaging applications where the material can be shipped to package assembly in a relatively dense form, and then lofted, on location. The loftiness attribute can also be useful as the loop for hook and loop attachment systems, wherein the loft created with strands enables hook attachment to the netting strands. As a second additional example, if the materials of the first and second sets of strands are of different strength, cross-machine direction stretching can cause one strand to stretch and the second set of strand to not stretch. This can be useful to create for example, elastic strands which provide machine direction elasticity, which are connected to small, oriented strands, which purpose is to hold the elastic strands in place. In some embodiments, netting could be made with cross-direction elasticity with relatively small strands that are elastic, connected to relatively large strands that are inelastic.

Figure 7:
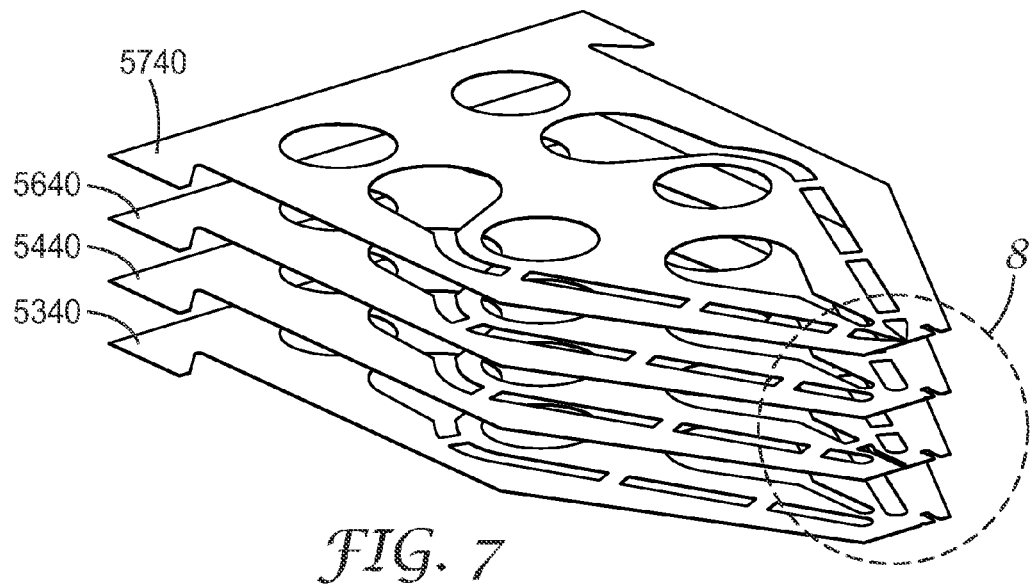
FIG. 7 is an exploded perspective assembly drawing of a repeating sequence of shims employing the shims of FIGS. 1, 2, 4, and 5.

Referring now to FIG. 1, a plan view of shim 5340 is illustrated. Shim 5340 has first aperture 5360a, second aperture 5360b, and third aperture 5360c. When shim 5340 is assembled with others as shown in FIG. 7, aperture 5360a will help define first cavity 5362a, aperture 5360b will help define second cavity 5362b, and aperture 5360c will help define third cavity 5362c. As will be discussed with more particularity below, molten polymer in cavities 5362a and 5362c can be extruded in a strand with a multilayer arrangement, and molten polymer in cavity 5362b can be extruded as a simple strand so as to form a three-dimensional polymeric strand netting described herein. Passageways 5368a, 5368b, and 5368c cooperated with analogous passageways on adjacent shims to allow passage from cavities 5362a, 5362b, and 5362c to the dispensing surfaces of the appropriate shims when the shims are as shown in FIG. 7.

Shim 5340 has several holes 47 to allow the passage of e.g. bolts to hold shim 5340 and others to be described below into an assembly. Shim 5340 also has dispensing surface 5367, and in this particular embodiment dispensing surface 5367 has indexing groove 5380 which can receive an appropriately shaped key to ease assembling diverse shims into a die. The shim may also have identification notch 5382 to help verify that the die has been assembled in the desired manner. This embodiment has shoulders 5390 and 5392 which can assist in mounting the assembled die in a mount of the type shown in FIG. 9.

Figure 2:
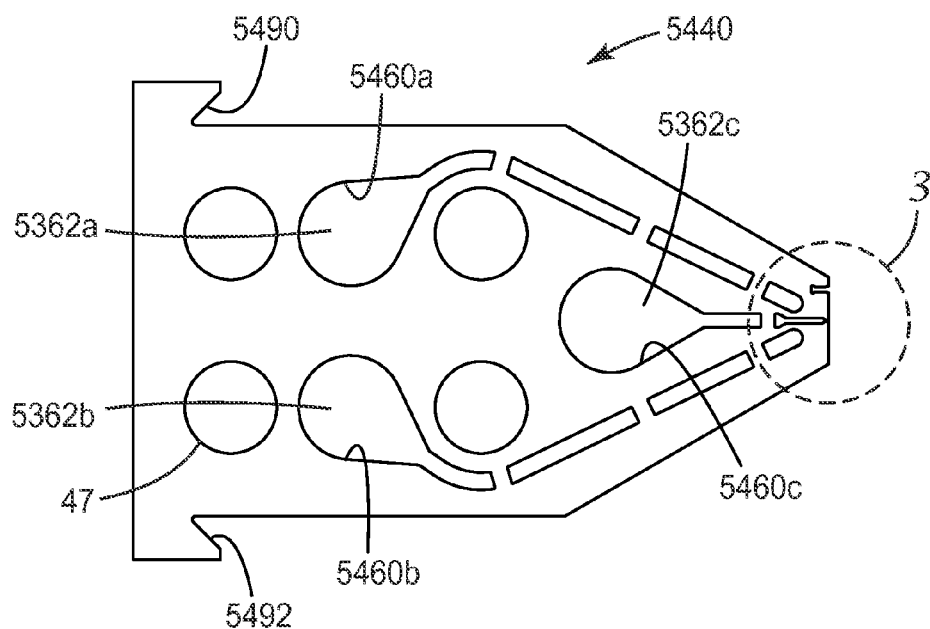
FIG. 2 is a plan view of another shim particularly suited to form a repeating sequence of shims capable of forming a three-dimensional polymeric strand netting described herein.

Referring now to FIG. 2, a plan view of shim 5440 is illustrated. Shim 5440 has first aperture 5460a, second aperture 5460b, and third aperture 5460c. When shim 5440 is assembled with others as shown in FIG. 7, aperture 5460a will help define first cavity 5362a, aperture 5460b will help define second cavity 5362b, and aperture 5460c will help define third cavity 5362c. This embodiment has shoulders 5490 and 5492 which can assist in mounting the assembled die in a mount of the type shown in FIG. 9.

Figure 3:
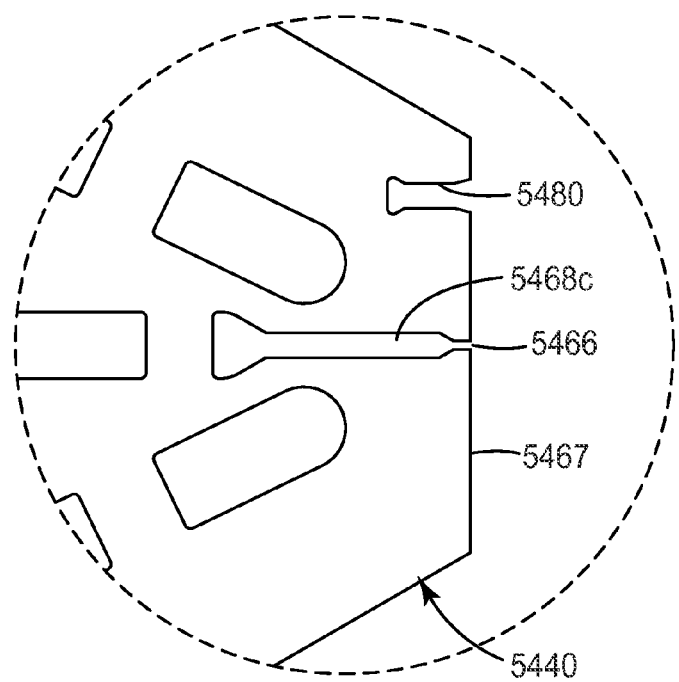
FIG. 3 is a detail view of the section referenced as "detail 3" in FIG. 2.

Referring now to FIG. 3, a detail view of the section referenced as "detail 3" in FIG. 2, is illustrated. Analogous to shim 5340, shim 5440 has dispensing surface 5467, and in this particular embodiment the dispensing surface 5467 has indexing groove 5480. It might seem that there is no path from cavity 5362c to dispensing orifice 5466, via, for example, passageway 5468c, but this is an illusion—the flow has a route in the perpendicular-to-the-plane-of-the-drawing dimension when the repeating sequence of FIG. 7 is completely assembled.

Figure 4:
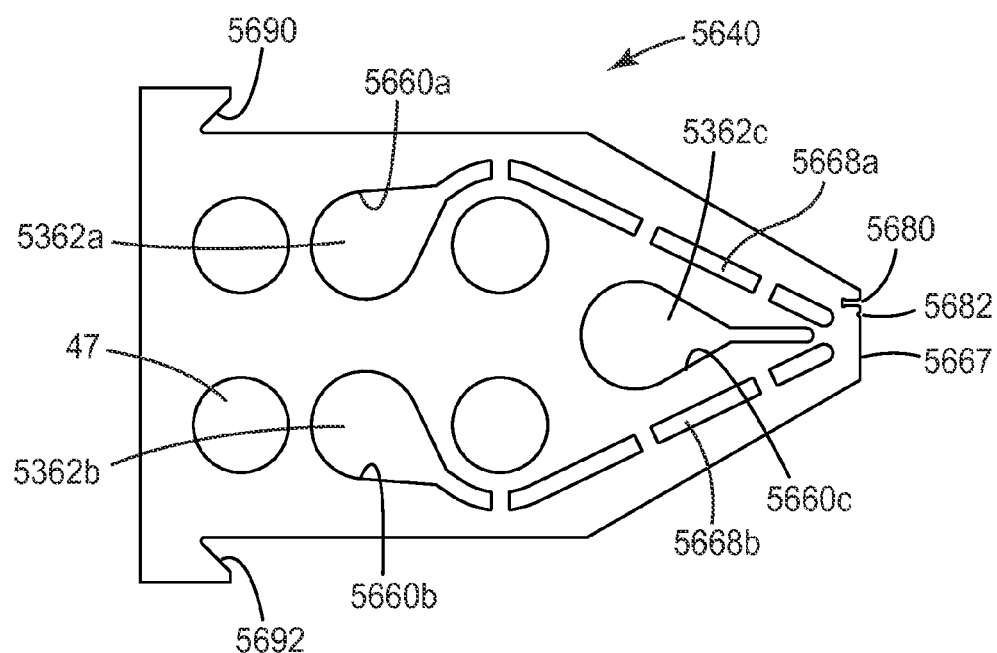
FIG. 4 is a plan view of another shim particularly suited to form a repeating sequence of shims capable of forming a three-dimensional polymeric strand netting described herein.

Referring now to FIG. 4, a plan view of shim 5640 is illustrated. Shim 5640 has first aperture 5660a, second aperture 5660b, and third aperture 5660c. When shim 5640 is assembled with others as shown in FIG. 7, aperture 5660a will help define first cavity 5362a, aperture 5660b will help define second cavity 5362b, and aperture 5660c will help define third cavity 5362c. Shim 5640 has dispensing surface 5667, and in this particular embodiment dispensing surface 5667 has indexing groove 5680 which can receive an appropriately shaped key to ease assembling diverse shims into a die. The shim may also have identification notch 5682 to help verify that the die has been assembled in the expected manner. This embodiment has shoulders 5690 and 5692 which can assist in mounting the assembled die in a mount of the type shown in FIG. 9. This shim may appear at first glance to be identical to shim 5340 in FIG. 1, however there are slight differences in the passageways 5668a and 5668b compared with passageways 5368a and 5368b to allow for robust movement of molten polymer from the cavities the dispensing surfaces of the several shims Referring now to FIG. 5, a plan view of a shim 5740 is illustrated. Shim 5740 has first aperture 5760a, second aperture 5760b, and third aperture 5760c. When shim 5740 is assembled with others as shown in FIG. 7, aperture 5760a will help define first cavity 5362a, aperture 5760b will help define second cavity 5362b, and aperture 5760c will help define third cavity 5362c. This embodiment has shoulders 5790 and 5792 which can assist in mounting the assembled die in a mount of the type shown in FIG. 9.

Figure 5:
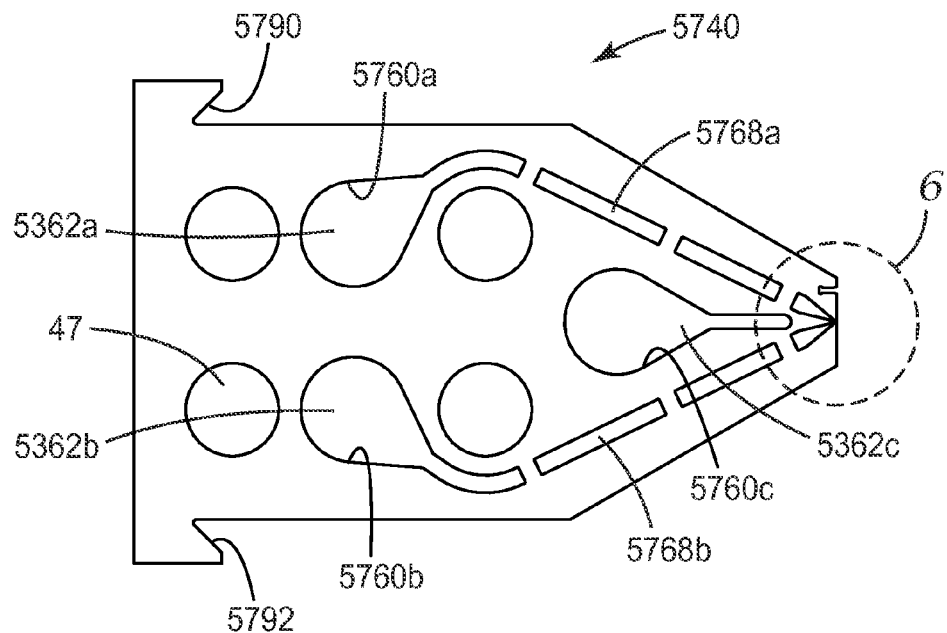
FIG. 5 is a plan view of another shim particularly suited to form a repeating sequence of shims capable of forming a three-dimensional polymeric strand netting described herein.
Figure 6:
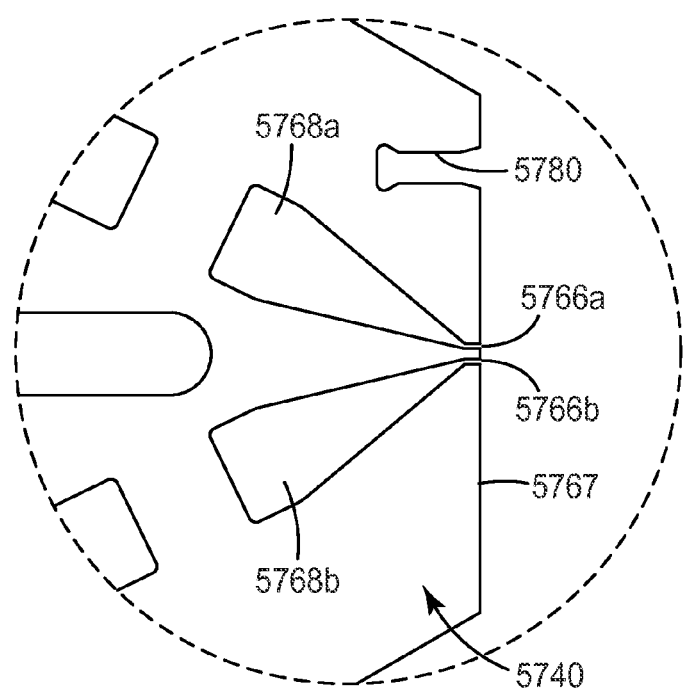
FIG. 6 is a detail view of the section referenced as "detail 6" in FIG. 5.
Figure 8:
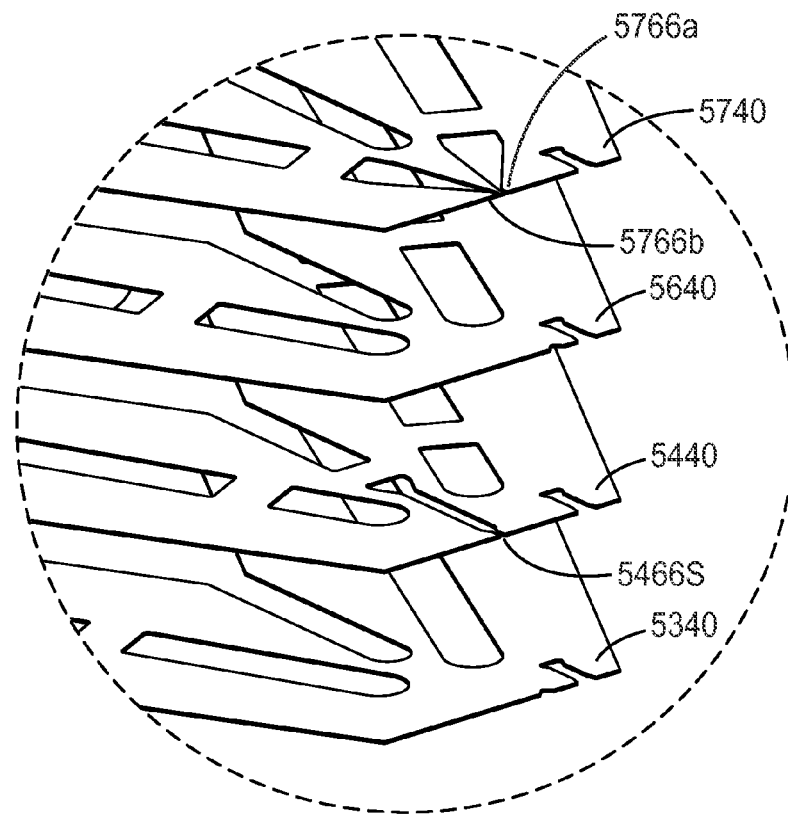
FIG. 8 is a detail view of the section referenced as "detail 8" in FIG. 7.

Referring now to FIG. 6, a detail view of the section referenced as "detail 6" in FIG. 5, is illustrated. Analogous to shim 5340, shim 5740 has dispensing surface 5767, and in this particular embodiment dispensing surface 5767 has indexing groove 5780. It might seem that there is no path from cavity 5362a to dispensing orifice 5766a, via, for example, passageway 5768a, nor a path from cavity 5362b to dispensing orifice 5766b, via, for example, passageway 5768b, but this is an illusion—the flow has a route in the perpendicular-to-the-plane-of-the-drawing dimension when the repeating sequence of FIG. 7 is completely assembled Referring now to FIG. 7, an exploded perspective assembly drawing of a repeating sequence of shims employing the shims of FIGS. 1, 2, 4, and 5 is illustrated. Referring now to FIG. 8, a detail view of the section referenced as "detail 8" in FIG. 7 is illustrated. In the particular illustrated embodiment, the repeating sequence includes, from bottom to top as the drawing is oriented, one instance of shim 5340, one instance of shim 5440, one instance of shim 5640, and one instance of shim 5740. In this view, it can be appreciated how a strand of a single material emerges from the egress provided dispensing orifice 5466, and how two different materials emerge from the closely spaced dispensing orifices 5766a and 5766b. For this configuration collisions between strands to form the three zones of net can be created by extruding 5466 strand at an extrusion speed that is at least two times different from strands 5766a and 5766b.

Figure 9:
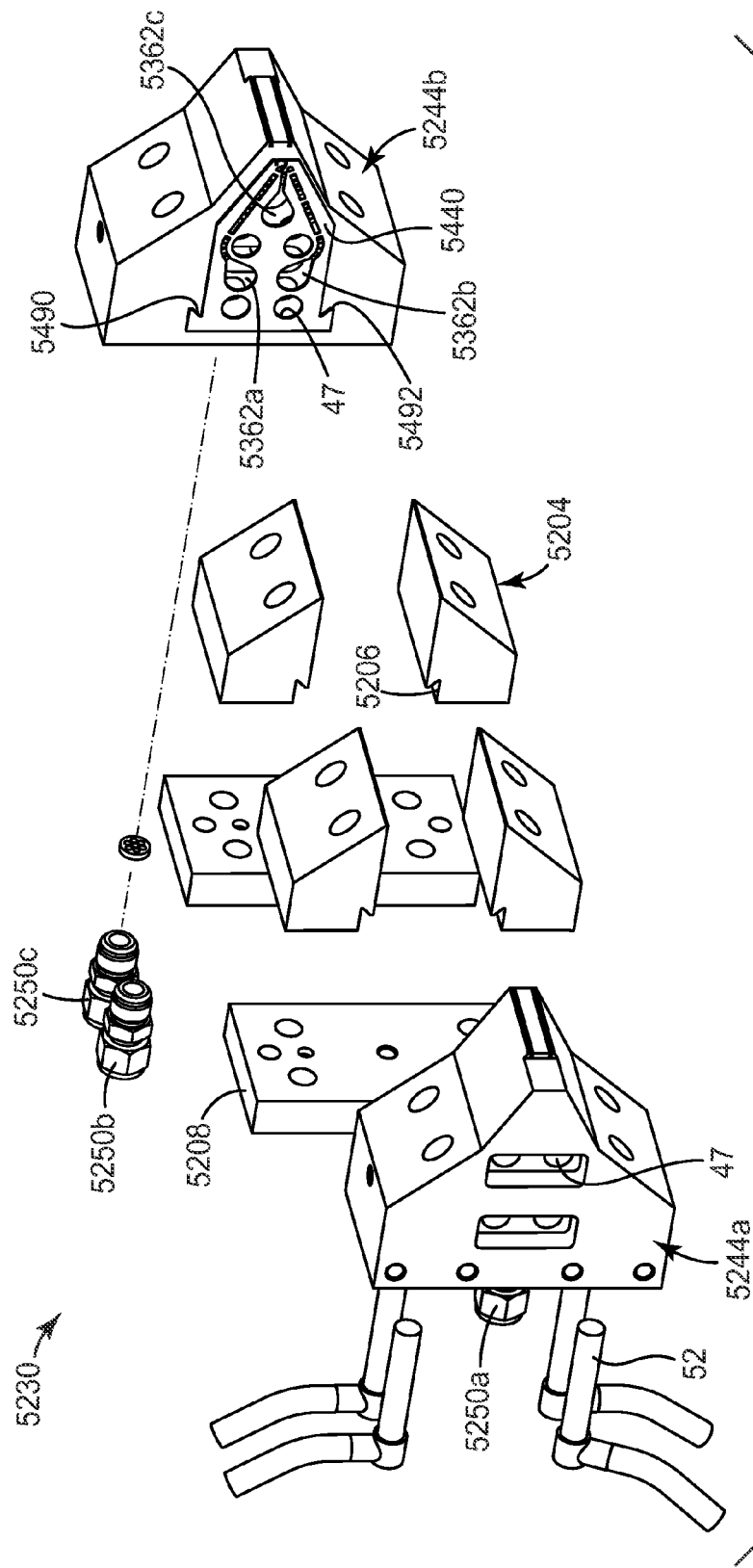
FIG. 9 is an exploded perspective view of a mount suitable for an extrusion die composed of multiple repeats of the repeating sequence of shims of FIG. 7.

Referring now to FIG. 9, an exploded perspective view of a mount 5230 suitable for an extrusion die composed of multiple repeats of the repeating sequence of shims of FIG.

7 is illustrated. Mount 5230 is particularly adapted to use shims 5340, 5440, 5640, and 5740 is shown in FIGS. 1, 2, 4 and 5. However for visual clarity, only a single instance of shim 5440 is shown in FIG. 9. The multiple repeats of the repeating sequence of shims of FIG. 7 are compressed between two end blocks 5244a and 5244b. Conveniently, through bolts can be used to assemble the shims to the end blocks 5244a and 5244b, passing through holes 47 in shims 5340 et al.

In this embodiment, inlet fittings 5250a and 5250b, and 5250c provide a flow path for three streams of molten polymer through the end blocks 5244a and 5244b to the cavities 5362a, 5362b, and 5362c. Compression blocks 5204 have a notch 5206 that conveniently engages the shoulders on the shims, e.g., 5490 and 5492 on 5440. When mount 5230 is completely assembled, compression blocks 5204 are attached by, e.g. machine bolts to backplates 5208. Holes are conveniently provided in the assembly for the insertion of cartridge heaters 52.

Figure 9A:
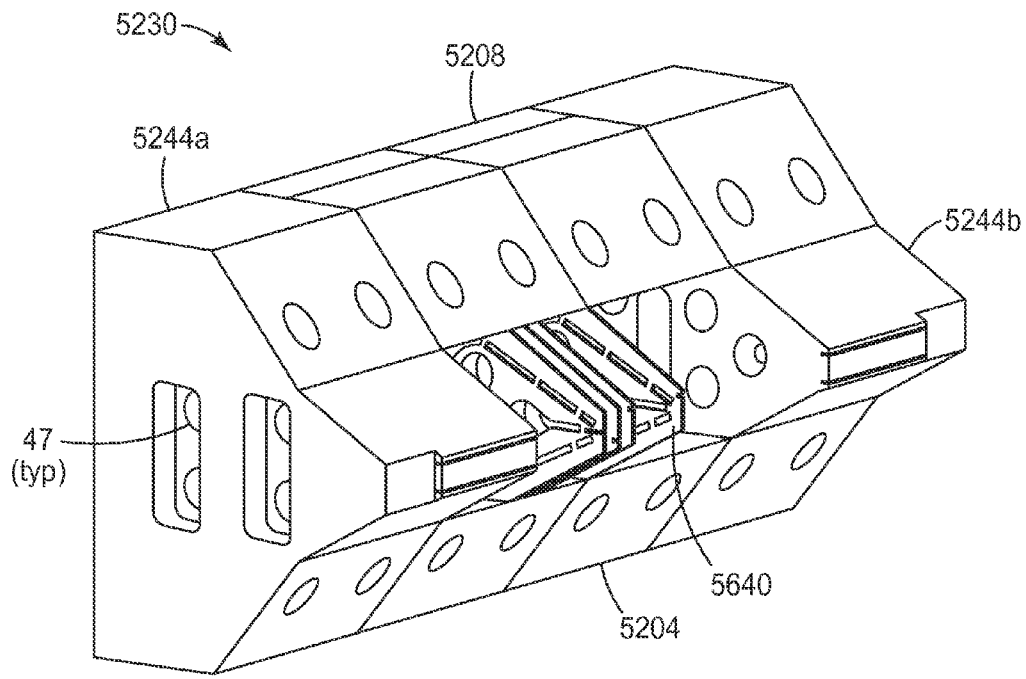
FIG. 9A is a perspective view of the mount of FIG. 9 in an assembled state.

Referring now to FIG. 9A, a perspective view of the mount 5230 of FIG. 9 is illustrated in a partially assembled state. A few shims, for example, 5440 are in their assembled positions to show how they fit within the mount 5230, but most of the shims that would make up an assembled die have been omitted for visual clarity.

Figure 10:
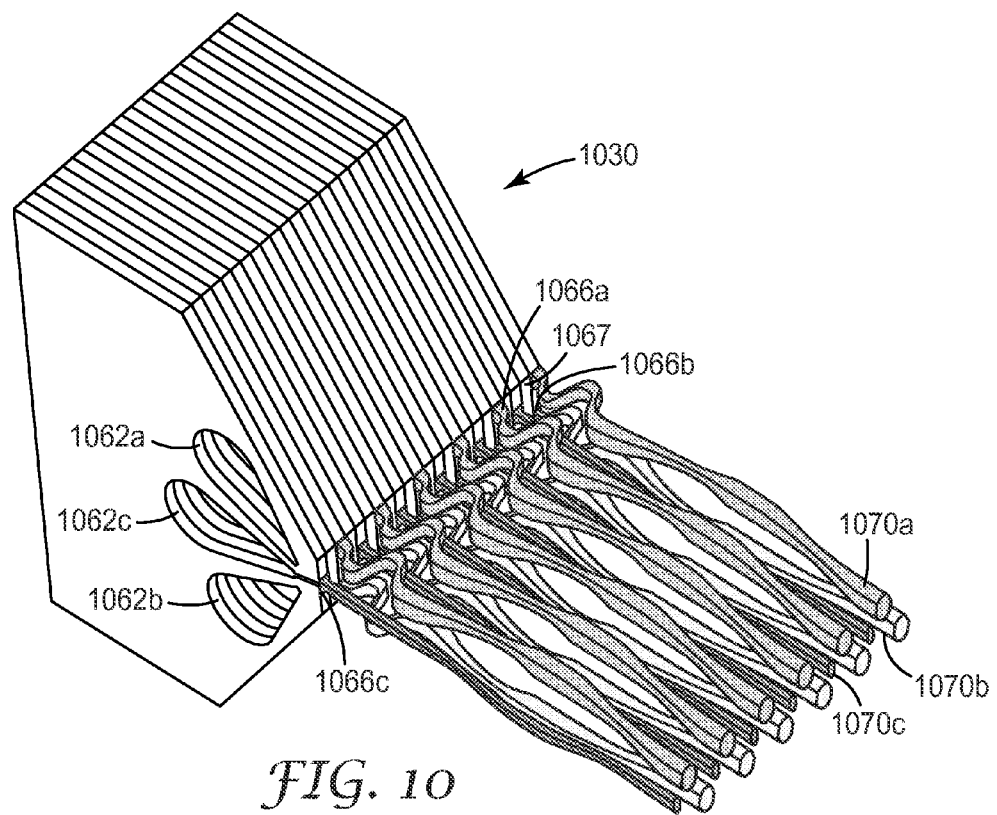
FIG. 10 is a schematic perspective view of a die producing multi-layer netting described herein.

Referring now to FIG. 10, a partial schematic perspective view of die 1030 producing multi-layer netting is illustrated. The view is partial because suitable end blocks have been omitted so that first cavity 1062a, second cavity 1062b, and third cavity 1062c can be seen. In this schematic view, first strands 1070a are being extruded from an array of first dispensing orifices 1066a, second strands 1070b are being extruded from an array of second dispensing orifices 1066b, and third strands 1070c are being extruded from an array of third dispensing orifices 1066c. In this view, both first strands 1070a and second strands 1070b are the ones being dispensed at a first strand speed which is at least 2 times the second strand speed at which third strands 1070c are being extruded. A three-dimensional netting is being formed.

Figure 11:
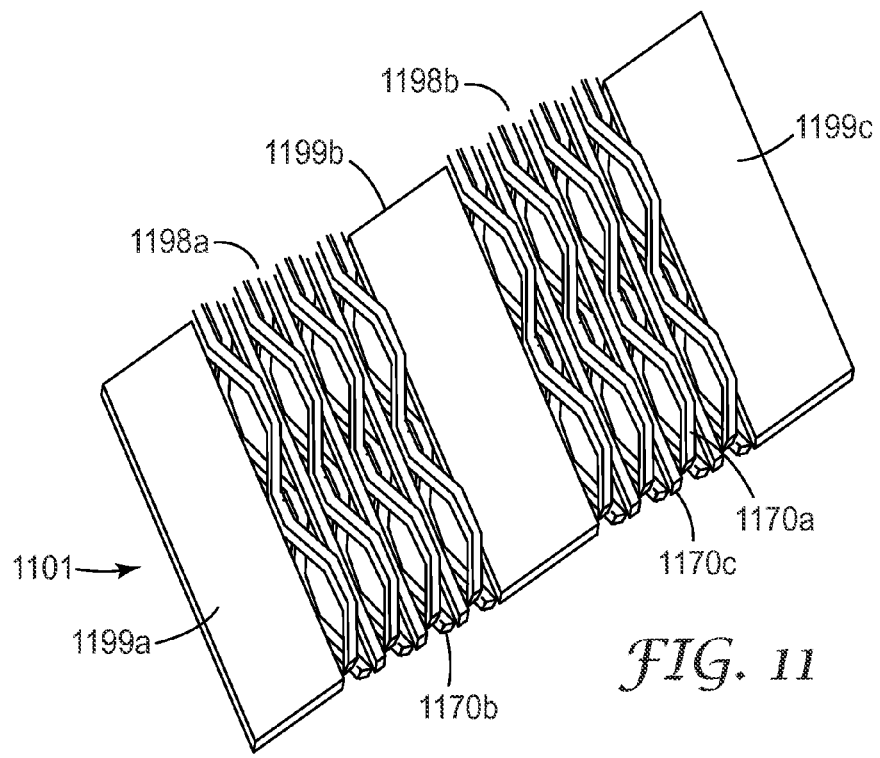
FIG. 11 is a perspective view of an exemplary article described herein having ribbon regions and multi-layer netting regions.

Referring now to FIG. 11, a perspective view of exemplary article described herein 1101 is illustrated. The present disclosure also provides an article comprising one or more three-dimensional netting as described herein, with a ribbon region disposed adjacent to or there between. Typically, the netting and ribbon region are integral. The present disclosure also provides an article comprising two netting regions described herein, each disposed between two ribbon regions. Typically, the netting and ribbon regions are integral. An example is shown in FIG. 11, where netting regions 1198a and 1198b, each comprising first strands 1170a, second strands 1170b, and third strands 1170c, are disposed between and connected to ribbon regions 1199a, 1199b, and 1198c. Ribbon regions 1199a, 1199b, and 1199c can be formed by constructing a portion of the die with a repeating sequence of shims all connected to a single one of the cavities.

Figure 12:
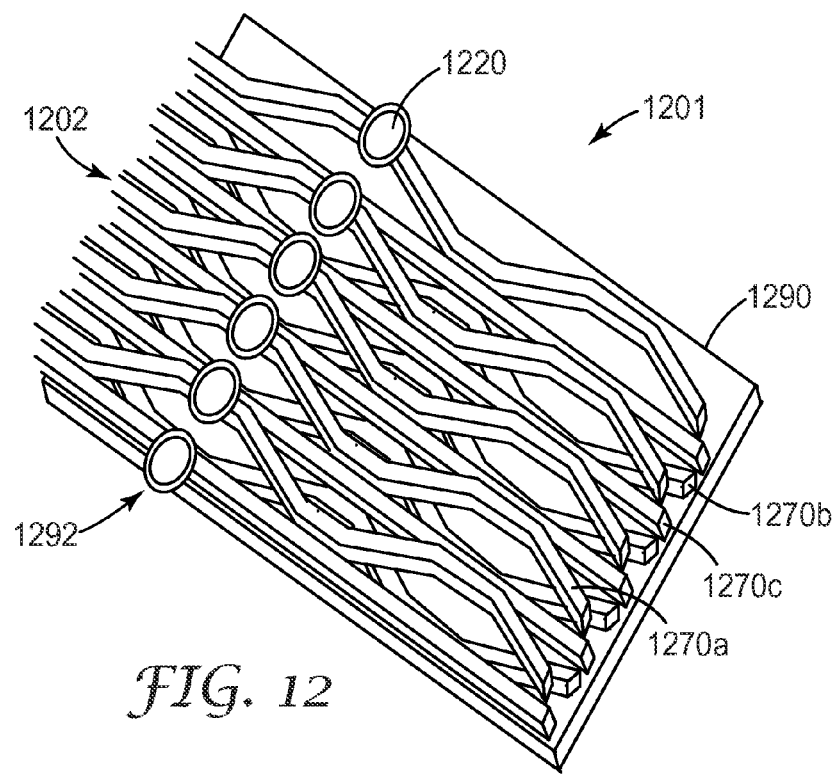
FIG. 12 is a perspective view of an exemplary article having a set of strands in a multi-layer netting, bonded to a substrate.

Referring now to FIG. 12, a perspective view of exemplary article 1201 is illustrated. Article 1201 comprises netting 1202 having strands 1270a, 1270b, and 1270c, wherein netting 1202 bonded to substrate 1290. The depicted three dimensional netting 1202 is periodically bonded to substrate 1290 at a series of bond points 1220 in bond line 1292. Substrate 1290 may be, for example, a polymeric film or a nonwoven fabric, depending on the end use intended for article 1201. Bond lines 1292 can be formed by heat or ultrasonic welding, the latter can be accomplished, for example, with a sonic bonder such as that available under the trade designation "OMHZ BRANSON 2000AED" from Branson Ultrasonics Corporation, Danbury, Conn.

Figure 13:
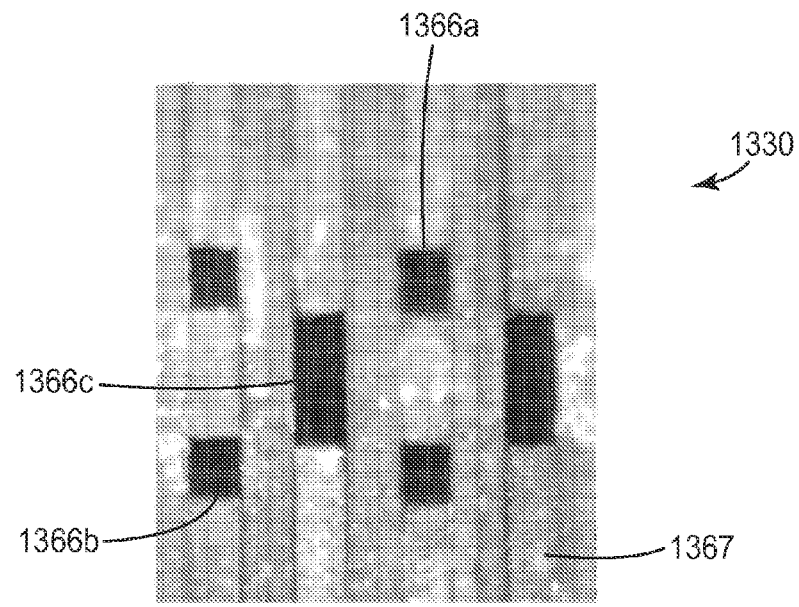
FIG. 13 is a digital optical image at 10× of a front view of a dispensing surface of a die, showing dispensing orifices at three different levels in the direction to both the machine direction and the cross-direction of the extruded multi-layer netting the die can produce.

FIG. 13 is a digital optical image of a front view at 10× of dispensing surface 1367 of die 1330, specifically the die used in the Example, below). The dispensing surface 1367 has dispensing orifices 1366a, 1366b, and 1366c at three different levels in the thickness direction of the netting to be produced. (The thickness direction is perpendicular to both the machine direction and the cross-direction of the extruded multi-layer netting.)

Figure 14:
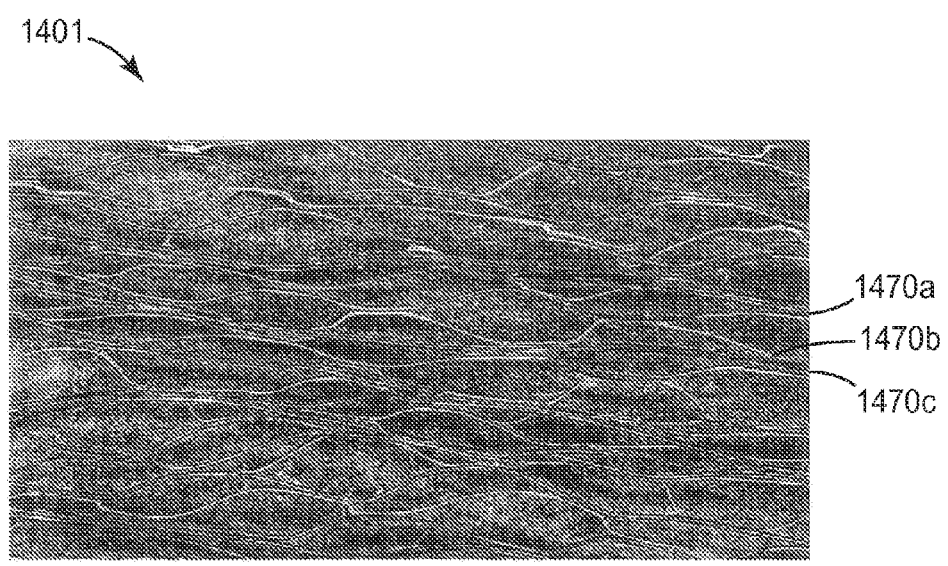
FIG. 14 is a digital optical image at 10× of an exemplary netting described herein.

FIG. 14 is a digital optical image at 10× of exemplary netting described herein (and made as described in the Example, below) 1401. Netting 1401 includes first strands 1470a, second strands 1470b, and thirds strands 1470c.

Portions of the exteriors of the first and second strands bond together at the bond regions. In methods described herein for making nettings described herein, the bonding occurs in a relatively short period of time (typically less than 1 second). The bond regions, as well as the strands typically cool through air and natural convection and/or radiation. In selecting polymers for the strands, in some embodiments, it may be desirable to select polymers of bonding strands that have dipole interactions (or H-bonds) or covalent bonds. Bonding between strands has been observed to be improved by increasing the time that the strands are molten to enable more interaction between polymers. Bonding of polymers has generally been observed to be improved by reducing the molecular weight of at least one polymer and or introducing an additional co-monomer to improve polymer interaction and/or reduce the rate or amount of crystallization. In some embodiments, the bond strength is greater than the strength of the strands forming the bond. In some embodiments, it may be desirable for the bonds to break and thus the bonds will be weaker than the strands.

Suitable polymeric materials for extrusion from dies described herein, methods described herein, and for composite layers described herein include thermoplastic resins comprising polyolefins (e.g., polypropylene and polyethylene), polyvinyl chloride, polystyrene, nylons, polyesters (e.g., polyethylene terephthalate) and copolymers and blends thereof. Suitable polymeric materials for extrusion from dies described herein, methods described herein, and for composite layers described herein also include elastomeric materials (e.g., ABA block copolymers, polyurethanes, polyolefin elastomers, polyurethane elastomers, metallocene polyolefin elastomers, polyamide elastomers, ethylene vinyl acetate elastomers, and polyester elastomers). Exemplary adhesives for extrusion from dies described herein, methods described herein, and for composite layers described herein include acrylate copolymer pressure sensitive adhesives, rubber based adhesives (e.g., those based on natural rubber, polyisobutylene, polybutadiene, butyl rubbers, styrene block copolymer rubbers, etc.), adhesives based on silicone polyureas or silicone polyoxamides, polyurethane type adhesives, and poly(vinyl ethyl ether), and copolymers or blends of these. Other desirable materials include, for example, styrene-acrylonitrile, cellulose acetate butyrate, cellulose acetate propionate, cellulose triacetate, polyether sulfone, polymethyl methacrylate, polyurethane, polyester, polycarbonate, polyvinyl chloride, polystyrene, polyethylene naphthalate, copolymers or blends based on naphthalene dicarboxylic acids, polyolefins, polyimides, mixtures and/or combinations thereof. Exemplary release materials for extrusion from dies described herein, methods described herein, and for composite layers described herein include silicone-grafted polyolefins such as those described in U.S. Pat. No. 6,465,107 (Kelly) and U.S. Pat. No. 3,471,588 (Kanner et al.), silicone block copolymers such as those described in PCT Publication No. WO96039349, published Dec. 12, 1996, low density polyolefin materials such as those described in U.S. Pat. No. 6,228,449 (Meyer), U.S. Pat. No. 6,348,249 (Meyer), and 5,948,517 (Adamko), the disclosures of which are incorporated herein by reference.

In some embodiments, the sheath has at least one of a melting or softening point, wherein the core has at least one of a melting or softening point, and where the at least one of the melting or softening point of the sheath is lower than at least one of the melting or softening point of the core.

In some embodiments, the first polymeric strands have the core of the first polymeric material and the sheath of the second, different polymeric material, wherein the second polymeric strands have a core of a third polymeric material and a sheath of a fourth polymeric material different from the third polymeric material, and wherein at least one of (a) the first polymeric material is different than the third polymeric material or (b) the second polymeric material is different than the fourth polymeric material. When one of more of the arrays of strands is configured as a core/sheath strand, the polymers forming the core and the sheath are independently a thermoplastic (e.g., adhesives, nylons, polyesters, polyolefins, polyurethanes, elastomers (e.g., styrenic block copolymers), and blends thereof. In some embodiments, the polymer forming the sheath is an adhesive material.

In some embodiments, polymeric materials used to make three-dimensional polymeric strand netting described herein may comprise a colorant (e.g., pigment and/or dye) for functional (e.g., optical effects) and/or aesthetic purposes (e.g., each has different color/shade). Suitable colorants are those known in the art for use in various polymeric materials. Exemplary colors imparted by the colorant include white, black, red, pink, orange, yellow, green, aqua, purple, and blue. In some embodiments, it is desirable level to have a certain degree of opacity for one or more of the polymeric materials. The amount of colorant(s) to be used in specific embodiments can be readily determined by those skilled in the (e.g., to achieve desired color, tone, opacity, transmissivity, etc.). If desired, the polymeric materials may be formulated to have the same or different colors.

Strands made using methods described herein do not substantially cross over each other (i.e., at least 50 (at least 55, 60, 65, 70, 75, 80, 85, 90, 95, 99, or even 100) percent by number).

In some embodiments, three-dimensional polymeric strand netting described herein have a thickness up to 750 micrometers (in some embodiments, up to 500 micrometers, 250 micrometers, 100 micrometers, 75 micrometers, 50 micrometers, or even up to 25 micrometers; in a range from 10 micrometers to 750 micrometers, 10 micrometers to 750 micrometers, 10 micrometers to 500 micrometers, 10 micrometers to 250 micrometers, 10 micrometers to 100 micrometers, 10 micrometers to 75 micrometers, 10 micrometers to 50 micrometers, or even 10 micrometers to 25 micrometers).

In some embodiments, the polymeric strands have an average width in a range from 10 micrometers to 500 micrometers (in a range from 10 micrometers to 400 micrometers, or even 10 micrometers to 250 micrometers).

In some embodiments, three-dimensional polymeric strand netting described herein have a basis weight in a range from 5 g/m² to 400 g/m² (in some embodiments, 10 g/m² to 200 g/m²), for example, three-dimensional polymeric strand netting as-made from dies described herein. In some embodiments, three-dimensional polymeric strand netting described herein after being stretched have a basis weight in a range from 0.5 g/m² to 40 g/m² (in some embodiments, 1 g/m² to 20 g/m²).

In some embodiments, three-dimensional polymeric strand netting described herein have a strand pitch in a range from 0.5 mm to 20 mm (in some embodiments, in a range from 0.5 mm to 10 mm)

It has been observed that when some of the embodiments of netting made according to the present disclosure are stretched, they will relax to a length that is less than their original length before stretching. While not wishing to be bound by theory, it is believed that this is due to curling of the bond regions within the netting structure.

Optionally, nettings described herein are attached to a backing. The backings may be, for example, one of a film, net, or non-woven. Films may be particularly desirable, for example, for applications utilizing clear printing or graphics. Nonwovens or nets may be particularly desirable, for example, where a softness and quietness that films typically do not have is desired. The netting may be stretched and bonded between at least two layers of film or nonwoven where the bond points have a plurality (at least two) of bond points that do not include the netting in the bond. Alternatively, an unstretched netting could be bonded between at least two layers of film or nonwoven where the bond points have a plurality (at least two) of bond points that do not include the netting in the bond. These constructions may require subsequent stretching, either localized ("ring rolling") or global, to become an activated elastic laminate.

In some embodiments, nettings described herein are elastic. In some embodiments, the polymeric strands have a machine direction and a cross-machine direction, wherein the netting or arrays of polymeric strands is elastic in machine direction, and inelastic in the cross-machine direction. Elastic means that the material will substantially resume its original shape after being stretched (i.e., will sustain only small permanent set following deformation and relaxation which set is less than 50 percent (in some embodiments, less than 25, 20, or even less than 10 percent) of the original length at moderate elongation (i.e., about 400-500%; in some embodiments, up to 300% to 1200%, or even up to 600 to 800%) elongation at room temperature). The elastic material can be both pure elastomers and blends with an elastomeric phase or content that will still exhibit substantial elastomeric properties at room temperature.

It is within the scope of the instant disclosure to use heat-shrinkable and non-heat shrinkable elastics. Non-heat shrinkable means that the elastomer, when stretched, will substantially recover sustaining only a small permanent set as discussed above.

In some embodiments, three-dimensional polymeric strand netting described herein of alternating first and second polymeric strands exhibit at least one of diamond-shaped or hexagonal-shaped openings.

In some embodiments, the polymeric strands have an average width in a range from 10 micrometers to 500 micrometers (in a range from 10 micrometers to 400 micrometers, or even 10 micrometers to 250 micrometers)

In some embodiments, the strands (i.e., the first strands, second strands, third strands and bond regions, and other optional strands, each have thicknesses that are substantially the same.

In some embodiments, the bond regions have an average largest dimension perpendicular to the strand thickness, and wherein the average largest dimension of the bond regions is at least 2 (in some embodiments, at least 3, 4, 5, 10, or even at least 15) times greater than the average width of at least one of the first strands or the second strands.

In some embodiments, netting described herein includes an array of engagement posts (e.g., hooks) for engaging with the netting. Engagement hooks can be made as is known in the art (see, for example, U.S. Pat. No. 5,077,870 (Melbye et al.)).

Nettings of polymeric strands described herein have a variety of uses, including wound care and other medical applications (e.g., elastic bandage-like material, surface layer for surgical drapes and gowns, and cast padding), tapes (including for medical applications), filtration, absorbent articles (e.g., diapers and feminine hygiene products) (e.g., as a layer(s) within the articles and/or as part of an attachment system for the articles or elastic components), pest control articles (e.g., mosquito nettings), geotextile applications (e.g., erosion control textiles), water/vapor management in clothing, reinforcement for nonwoven articles (e.g., paper towels), self bulking articles (e.g., for packaging) where the netting thickness is increased by stretching nettings with first strands have average first yield strength, and wherein the second strands have an average second yield strength that is different (e.g., at least 10 percent different) than the first yield strength, floor coverings (e.g., rugs and temporary mats), grip supports for tools, athletic articles, breathable elastic wrist and headbands, electrodes in light weight lead acid batteries, and pattern coated adhesives.

Advantages of some embodiments of nettings described herein when used as a backing, for example, for some tapes and wound dressings can include conformability, particularly in the cross direction (e.g., at least 50% elongation in the machine direction).

In some embodiments, nettings described herein are made of, or coated with, hydrophilic material to make them absorbent. In some embodiments, nettings described herein are useful as wound absorbants to remove excess exudate from wounds, and in some embodiments, nettings described herein are made of bioresorbable polymers.

In some filtration applications, the netting can be used, for example, to provide spacers between filtering layers for filtration packs and/or to provide rigidity and support for filtration media. In some embodiments, several layers of the netting are used, where each layer is set to provide optimal filtering. Also, in some embodiments, the elastic feature of some nettings described herein can facilitate expansion the filter as the filter fills up.

In some embodiments, nettings described herein have high and low modulus strands such that stretching netting having a curled bond area can generate a lofted, accessible fiber for hook attachment (i.e., for an attachment system). In such oriented nettings attachment loops can have fiber strengths that are greater than unoriented nettings.

In some embodiments, nettings described herein that are elastic can flex in the machine direction, cross direction, or both directions, which can provide, for example, comfort and fit for diapers. Elastic netting can also provide a breathable, soft, and flexible attachment mechanism (e.g., elastic netting can be attached to posts that fit through the elastic net, the elastic netting can be made with a ribbon region section attached to the netting to provide the fingerlift, the elastic can be made as elastic in one direction and inelastic in the second direction with an elastic and inelastic strand, or the ribbon region section can have molded hooks to provide attachment to a loop).

In some embodiments, nettings described herein useful as grip supports for tools, athletic articles are made using high friction polymers.

Some embodiments of nettings described herein can be used as or in disposable absorbent articles that may be useful, for example as personal absorbent articles for absorbing bodily fluids (e.g., perspiration, urine, blood, and menses) and disposable household wipes used to clean up similar fluids or typical household spills.

A particular example of a disposable absorbent article comprising nettings described herein are disposable absorbent garments such as infant diapers or training pants, products for adult incontinence, feminine hygiene products (e.g., sanitary napkins and panty liners). A typical disposable absorbent garment of this type is formed as a composite structure including an absorbent assembly disposed between a liquid permeable bodyside liner and a liquid impermeable outer cover. These components can be combined with other materials and features such as elastic materials and containment structures to form a product that is specifically suited to its intended purposes, Feminine hygiene tampons are also well known and generally are constructed of an absorbent assembly and sometimes an outer wrap of a fluid pervious material.

In some embodiments, at least some of strands are electrically conductive material on an outer surface thereof. In some embodiments, at least some of the strands are coated with an electrically conductive material (e.g., graphite, silver, and nickel), wherein methods for making netting described herein further comprise applying (e.g., coating) an electrically conductive material onto at least a portion of the outer surface of the netting. In some embodiments, the polymer of at least some of the strands comprise electrically conductive material (e.g., electrically conductive particles), wherein the electrically conductive material is added to the polymer before it is processed into the netting. These electrically conductive nettings can be useful, for example, as electrodes in light weight lead acid batteries.

Additional information that may be useful in making and using nettings described therein, when combined with the instant disclosure, can be found in applications having U.S. Ser. Nos. 61/526,001, filed Aug. 22, 2011, and 61/530,521, filed Sep. 2, 2011, the disclosures of which are incorporated herein by reference.

Exemplary Embodiments

1A. A three-dimensional polymeric strand netting, wherein a plurality of the polymeric strands are periodically joined together in a regular pattern at bond regions throughout the netting, wherein at least some (in some embodiments, a majority by number) of the polymeric strands are periodically bonded to at least three (four, five, six, or more) adjacent polymeric strands, and wherein no polymeric strands are continuously bonded to another polymeric strand.

2A. The three-dimensional polymeric strand netting of Embodiment 1A, wherein the three-dimensional network of polymeric strands has a thickness up to 750 micrometers (in some embodiments, up to 500 micrometers, 250 micrometers, 100 micrometers, 75 micrometers, 50 micrometers, or even up to 25 micrometers; in a range from 10 micrometers to 750 micrometers, 10 micrometers to 750 micrometers, 10 micrometers to 500 micrometers, 10 micrometers to 250 micrometers, 10 micrometers to 100 micrometers, 10 micrometers to 75 micrometers, 10 micrometers to 50 micrometers, or even 10 micrometers to 25 micrometers).

3A. The three-dimensional polymeric strand netting of either Embodiment 1A or 2A having a basis weight in a range from 5 g/m$^2$ to 400 g/m$^2$ (in some embodiments, 10 g/m$^2$ to 200 g/m$^2$).

4A. The three-dimensional polymeric strand netting of either Embodiment 1A or 2A having a basis weight in a range from 0.5 g/m² to 40 g/m² (in some embodiments, 1 g/m² to 20 g/m²).

5A. The three-dimensional polymeric strand netting of any preceding Embodiment having a strand pitch in a range from 0.5 mm to 20 mm (in some embodiments, in a range from 0.5 mm to 10 mm)

6A. The three-dimensional polymeric strand netting of any preceding Embodiment that is elastic.

7A. The three-dimensional polymeric strand netting of any of Embodiments 1A to 6A having a machine direction and a cross-machine direction, and being elastic in machine direction, and inelastic in the cross-machine direction.

8A. The three-dimensional polymeric strand netting of any of Embodiments 1A to 7A having a machine direction and a cross-machine direction, wherein the netting is inelastic in machine direction, and elastic in the cross-machine direction.

9A. The three-dimensional polymeric strand netting of any preceding Embodiment, wherein at least some of the polymeric stands include at least one of a dye or pigment therein.

10A. The three-dimensional polymeric strand netting of any preceding Embodiment that exhibits at least one of diamond-shaped or hexagonal-shaped openings.

11A. The three-dimensional polymeric strand netting of any preceding Embodiment, wherein at least some of the polymeric strands comprise a first polymer that is a thermoplastic (e.g., adhesives, nylons, polyesters, polyolefins, polyurethanes, elastomers (e.g., styrenic block copolymers), and blends thereof).

12A. The three-dimensional polymeric strand netting of Embodiment 11A, wherein the first polymer is an adhesive material.

13A. The three-dimensional polymeric strand netting of any preceding Embodiment, wherein the plurality of strands include alternating first and second polymeric strands, wherein the second polymeric strands comprise a second polymer.

14A. The three-dimensional polymeric strand netting of Embodiment 13A, wherein the wherein the first polymeric strands comprise the first polymer, and wherein the second polymeric strands comprise a second polymer that is a thermoplastic (e.g., adhesives, nylons, polyesters, polyolefins, polyurethanes, elastomers (e.g., styrenic block copolymers), and blends thereof).

15A. The three-dimensional polymeric strand netting of any of Embodiments 11A to 14A further comprising third strands disposed between at least some of the alternating first and second strands.

16A. The three-dimensional polymeric strand netting of any of Embodiments 1A to 10A, wherein at least a plurality (i.e., at least two) of the polymeric strands have a core of a first polymeric material and a sheath of a second, different polymeric material.

17A. The three-dimensional polymeric strand netting of any preceding Embodiment, wherein the sheath has at least one of a melting or softening point, wherein the core has at least one of a melting or softening point, and where the at least one of the melting or softening point of the sheath is lower than at least one of the melting or softening point of the core.

18A. The three-dimensional polymeric strand netting of either Embodiment 16A or 17A, wherein at least some of the cores have at least two (in some embodiments at least 3 or more) sheaths.

19A. The three-dimensional polymeric strand netting of Embodiment 16A to 18A having a negative permanent set.

20A. The three-dimensional polymeric strand netting of any of Embodiments 1A to 19A, wherein the polymeric strands have an average width in a range from 10 micrometers to 500 micrometers (in a range from 10 micrometers to 400 micrometers, or even 10 micrometers to 250 micrometers).

21A. The three-dimensional polymeric strand netting of any preceding Embodiment that is stretched.

22A. The three-dimensional polymeric strand netting of any preceding Embodiment, wherein at least some of strands are electrically conductive.

23A. The three-dimensional polymeric strand netting of Embodiment 22A, wherein at least some of the strands are coated with an electrically conductive material 24A. The three-dimensional polymeric strand netting of either Embodiment 22A or 23A, wherein at least some of the strands comprise electrically conductive material.

25A. An article comprising a backing having the three-dimensional polymeric strand netting of any preceding Embodiment on a major surface thereof.

26A. The article of Embodiment 25A, wherein the backing is one of a film, net, or non-woven.

27A. The article of Embodiment 26A that includes bond lines.

28A. An article comprising the three-dimensional polymeric strand netting of any of Embodiment 1A to 24A disposed between two non-woven layers.

29A. An article of any of Embodiments 1A to 24A comprising two of the three-dimensional polymeric strand netting with a ribbon region disposed there between.

30A. The article of Embodiment 29A, wherein the three-dimensional polymeric strand netting and ribbon region are integral.

31A. The article of either Embodiment 29A or 30A, wherein the ribbon region has a major surface with engagement posts thereon.

32A. An article comprising the three-dimensional polymeric strand netting of any of Embodiments 1A to 24A disposed between two ribbon regions.

33A. The article of Embodiment 32A, wherein the three-dimensional polymeric strand netting is integral with each of the ribbon regions.

34A. The article of either Embodiment 32A or 33A, wherein the film has a major surface with engagement posts thereon.

35A. An attachment system comprising the three-dimensional polymeric strand netting of any of Embodiments 1A to 24A and an array of engagement posts (e.g., hooks) for engaging with the three-dimensional network of polymeric strands.

36A. An absorbent article comprising the attachment system of Embodiment 33A.

37A. A method of making the three-dimensional polymeric strand netting of any of Embodiments 1A to 24A, the method comprising:

providing an extrusion die comprising a plurality of shims positioned adjacent to one another, the shims together defining at least a first cavity (in some embodiments, a second cavity, a third cavity, and/or more cavities) and a dispensing surface, wherein the dispensing surface has a first array of first dispensing orifices and a second array of second dispensing orifices positioned adjacent to each other, alternating with a third array of third dispensing orifices, wherein the plurality of shims comprises a plurality of a repeating sequence of shims, wherein the repeating sequence comprises a shim that provides a fluid passageway between a cavity and one of the first dispensing orifices, a shim that provides a fluid passageway between a cavity and one of the second dispensing orifices, and a shim that provides a fluid passageway between a cavity and one of the third dispensing orifices; and dispensing polymeric strands from at least one of the first, second, or third arrays of dispensing orifices at a first strand speed while simultaneously dispensing polymeric strands from at least one of the other arrays at a second strand speed, wherein the first strand speed is at least 2 (in some embodiments, in a range from 2 to 6, or even 2 to 4) times the second strand speed to provide the three-dimensional netting dispensing polymeric strands from at least one of the first, second, or third arrays of dispensing orifices at a first strand speed while simultaneously dispensing polymeric strands from at least one of the other arrays at a second strand speed, wherein the first strand speed is at least 2 (in some embodiments, in a range from 2 to 6, or even 2 to 4) times the second strand speed to provide the three-dimensional netting.

1B. An extrusion die comprising a plurality of shims positioned adjacent to one another, the shims together defining at least a first cavity and a dispensing surface, wherein the dispensing surface has a first array of first dispensing orifices, a second array of second dispensing orifices, and a third array of third dispensing orifices, the third array being disposed generally between the first and second arrays; wherein the plurality of shims comprises a plurality of a repeating sequence of shims, wherein the repeating sequence comprises a shim that provides a fluid passageway between a cavity and one of the first dispensing orifices, a shim that provides a fluid passageway between a cavity and one of the second dispensing orifices, and a shim that provides a fluid passageway between a cavity and one of the third dispensing orifices.

2B. The extrusion die of Embodiment 1B, wherein the repeating sequence further comprises at least one spacer shim.

3B. The extrusion die of any of either Embodiments 1B or 2B, wherein the dispensing orifices of each respective array are collinear.

4B. The extrusion die of Embodiment 3B, wherein the third array is offset from the first and second arrays.

5B. The extrusion die of any of Embodiments 1B to 4B further comprising a manifold body for supporting the shims, the manifold body having at least one manifold therein, the manifold having an outlet; and further comprising an expansion seal disposed so as to seal the manifold body and the shims, wherein the expansion seal defines a portion of the cavity, and wherein the expansion seal allows a conduit between the manifold and the cavity.

6B. The extrusion die of Embodiment 5B, wherein the shims define a second cavity, and the expansion seal defines a portion of both the first and the second cavities.

7B. The extrusion die of any of Embodiments 1B to 6B, wherein each of the dispensing orifices of the first and the second and third arrays have a width, and wherein each of the dispensing orifices of the first, second, and third arrays are spaced apart by at least twice the width of the respective dispensing orifice.

8B. The extrusion die of Embodiments 1B to 7B, wherein each orifice has a height, and wherein the arrays of orifices are offset by an amount of spacing not greater than the height of adjacent orifices.

9B. The extrusion die of any of Embodiments 1B to 8B, wherein the first array is supplied with molten polymer from a cavity so as to dispense the polymer from the first array; the second array is supplied with molten polymer from a cavity so as to dispense the polymer from the second array at the first strand speed; and wherein the third array is supplied with molten polymer from a cavity so as to dispense the polymer from the second array at a second strand speed; and wherein the first strand speed differs from the second strand speed differs by a factor of at least 2 (in some embodiments in a range from 2 to 6, or even 2 to 4) times the second strand speed, such that a netting comprising an array of alternating first and second polymeric strands is formed.

10B. The extrusion die of any of Embodiments 1B to 9B, wherein the fluid passageway is up to 5 mm in length.

11B. The extrusion die of any of Embodiments 1B to 10B, wherein the shims further define at least a second cavity, wherein the repeating sequence of shims provide a fluid passageway from both the first and second cavities to one of the arrays, and wherein the first cavity is supplied with a first polymer and the second cavity is supplied with a second polymer so as to dispense two-component strands from that array.

12B. The extrusion die of Embodiment 11B wherein the two-component strand has a core/sheath arrangement.

Advantages and embodiments of this invention are further illustrated by the following examples, but the particular materials and amounts thereof recited in these examples, as well as other conditions and details, should not be construed to unduly limit this invention. All parts and percentages are by weight unless otherwise indicated.

Example

A co-extrusion die as generally depicted in FIG. 9, with 3 cavities, with a 4 shim repeating pattern of extrusion orifices as generally illustrated in FIGS. 7 and 8, was prepared. The thickness of each shim was 4 mils (102 mm). The shims were formed from stainless steel, with perforations cut by a wire electron discharge machining. The height of the first and third extrusion orifice was cut to 5 mils (0.127 mm). The first and third extrusion orifices were cut into the same shim at a spacing of 10 mils (0.254 mm) between orifice edges as generally illustrated in FIGS. 5 and 6. The height of the second set of extrusion orifices was cut to 10 mils (0.254 mm) as generally illustrated in FIGS. 2 and 3. The extrusion orifices were aligned in a collinear, alternating arrangement as shown in FIG. 13 below, such that the second extrusion orifice was centered between the first and third orifices. The total width of the shim setup was 10 cm.

The inlet fittings on the two end blocks were each connected to a conventional single-screw extruder. The first and third extrusion cavity were connected together to the same extruder. A chill roll was positioned adjacent to the distal opening of the coextrusion die to receive the extruded material. The extruder feeding the first and third cavity was loaded with thirty-five melt flow index polypropylene pellets (obtained under the trade designation "EXXONMOBIL 3155 PP" from ExxonMobil, Irving Tex.).

The extruder feeding the second cavity was loaded with thirty five melt flow index polypropylene pellets (obtained under the trade designation "EXXONMOBIL 3155 PP" from ExxonMobil). Other process conditions are listed below:

| | |
|---|---|
| First orifice width: | 0.102 mm |
| First orifice height: | 0.127 mm |
| Second orifice width: | 0.102 mm |

-continued

| | |
|---|---|
| Second orifice height: | 0.254 mm |
| Third orifice width | 0.102 mm |
| Third orifice height: | 0.127 mm |
| Ratio of orifice height to width for oscillating strand s | 1.25:1 |
| Land spacing between orifices | 0.102 mm |
| Flow rate of first and third orifice polymer | 0.68 kg/hr. |
| Flow rate of second orifice polymer | 0.18 kg/hr. |
| Extrusion temperature | 193° C. |
| Quench roll temperature | 15° C. |
| Quench takeaway speed | 4.6 m/min. |

Using an optical microscope, the three-dimensional polymeric strand netting dimensions were measured and are shown below.

| | |
|---|---|
| Netting thickness | 0.18 mm |
| Netting basis weight | 40 grams |
| Bond length in the machine direction | 1.0 mm |
| Netting bonding distance in the machine direction (pitch) | 4.5 mm |
| First polymer strand width | 0.08 mm |
| Second polymer strand width | 0.05 mm |

The resulting three-dimensional polymeric strand netting had first to second strand cross-sections with a cross sectional area ratio of 1:2. An optical photograph of the three-dimensional polymeric strand netting is shown in FIG. 14.

Foreseeable modifications and alterations of this disclosure will be apparent to those skilled in the art without departing from the scope and spirit of this invention. This invention should not be restricted to the embodiments that are set forth in this application for illustrative purposes.

What is claimed is:

1. A three-dimensional polymeric strand netting, wherein a plurality of the polymeric strands are periodically joined together in a regular pattern at bond regions throughout the netting, wherein at least some of the polymeric strands are periodically bonded to at least three adjacent polymeric strands, wherein the at least three adjacent polymeric strands are periodically bonded to the polymeric strands on more than one plane, wherein the strands joined together at the bond regions do not substantially cross over each other, and wherein no polymeric strands are continuously bonded to another polymeric strand.

2. The three-dimensional polymeric strand netting of claim 1, wherein the three-dimensional network of polymeric strands has a thickness up to 750 micrometers.

3. The three-dimensional polymeric strand netting of claim 1 having a basis weight in a range from 5 g/m² to 400 g/m² or a range from 0.5 g/m² to 40 g/m².

4. The three-dimensional polymeric strand netting of claim 1, wherein at least a plurality of the polymeric strands have a core of a first polymeric material and a sheath of a second, different polymeric material.

5. The three-dimensional polymeric strand netting of claim 1, wherein at least some of strands are electrically conductive.

6. The three-dimensional polymeric strand netting of claim 1 having a basis weight in a range from 0.5 g/m² to 40 g/m².

7. The three-dimensional polymeric strand netting of claim 1 having a strand pitch in a range from 0.5 mm to 20 mm.

8. The three-dimensional polymeric strand netting of claim 1 that is elastic.

9. The three-dimensional polymeric strand netting of claim 1 having a machine direction and a cross-machine direction, and being elastic in machine direction, and inelastic in the cross-machine direction.

10. The three-dimensional polymeric strand netting of claim 1 having a machine direction and a cross-machine direction, wherein the netting is inelastic in machine direction, and elastic in the cross-machine direction.

11. An article comprising a backing having the three-dimensional polymeric strand netting of claim 1 on a major surface thereof.

12. An article comprising two of the three-dimensional polymeric strand nettings of claim 1 and a ribbon region disposed there between.

13. The article of claim 12, wherein the three-dimensional polymeric strand netting and ribbon region are integral.

14. The article of claim 12, wherein the ribbon region has a major surface with engagement posts thereon.

15. An attachment system comprising the three-dimensional polymeric strand netting of claim 1 and an array of engagement posts for engaging with the three-dimensional network of polymeric strands.

16. A method of making the three-dimensional polymeric strand netting of claim 1, the method comprising:

providing an extrusion die comprising a plurality of shims positioned adjacent to one another, the shims together defining at least a first cavity and a dispensing surface, wherein the dispensing surface has a first array of first dispensing orifices, a second array of second dispensing orifices, and a third array of third dispensing orifices, the third array being disposed generally between the first and second arrays, wherein the plurality of shims comprises a plurality of a repeating sequence of shims, wherein the repeating sequence comprises a shim that provides a fluid passageway between a cavity and one of the first dispensing orifices, a shim that provides a fluid passageway between a cavity and one of the second dispensing orifices, and a shim that provides a fluid passageway between a cavity and one of the third dispensing orifices; and dispensing polymeric strands from at least one of the first, second, or third arrays of dispensing orifices at a first strand speed while simultaneously dispensing polymeric strands from at least one of the other arrays at a second strand speed, wherein the first strand speed is at least 2 times the second strand speed to provide the three-dimensional netting dispensing polymeric strands from at least one of the first, second, or third arrays of dispensing orifices at a first strand speed while simultaneously dispensing polymeric strands from at least one of the other arrays at a second strand speed, wherein the first strand speed is at least 2 times the second strand speed to provide the three-dimensional netting.

* * * * *

UNITED STATES PATENT AND TRADEMARK OFFICE
CERTIFICATE OF CORRECTION

PATENT NO. : 9,724,865 B2
APPLICATION NO. : 14/349104
DATED : August 8, 2017
INVENTOR(S) : Ronald Ausen It is certified that error appears in the above-identified patent and that said Letters Patent is hereby corrected as shown below:

Column 8
Line 28, after "shims" insert -- . --.

Column 12
Line 8, after "mm)" insert -- . --.

Column 15
Line 8, after "mm)" insert -- . --.

Signed and Sealed this
Seventh Day of November, 2017

Joseph Matal
*Performing the Functions and Duties of the
Under Secretary of Commerce for Intellectual Property and
Director of the United States Patent and Trademark Office*